Patented June 3, 1930

1,762,105

UNITED STATES PATENT OFFICE

AUGUST J. PACINI, OF CHICAGO, ILLINOIS, ASSIGNOR TO CHARLES M. RICHTER, OF CHICAGO, ILLINOIS

METHOD OF SYNTHESIZING VITAMINS

No Drawing.   Application filed August 20, 1928. Serial No. 300,955.

This invention relates to the synthesis of vitamins and with regard to certain more specific features to a method for the production of vitamin A based upon the use of a suitable substrate acted upon by radiations inclusive of infra-red and ultra-violet.

Among the several objects of the invention may be noted the provision of means whereby the synthesis of vitamin A may be carried on without oxygenation which is destructive of the ends for which the synthesis is carried on; and the provision of means of the class described which is exceedingly simple and universal in application.

Other objects will be in part obvious and in part pointed out hereinafter.

The invention accordingly comprises the elements and combinations of elements, steps and sequence of steps, features of construction and arrangements which will be exemplified in the articles hereinafter described, and the scope of the application of which will be indicated in the following claims.

It is now known that the various vitamins A, B, and D accelerate growth and in addition the separate groups enumerated show distinguishing characteristics under proper conditions of animal experimentation.

Thus, vitamin A is growth-producing, is also anti-xerophthalmic and is considered fat soluble. Vitamin B is growth-producing, anti-beriberic, and water soluble. Vitamin D is growth-producing, anti-ricketic and fat soluble.

Formerly, vitamin A was undifferentiated and comprised growth-producing properties, anti-xerophthalmic properties and anti-ricketic properties. In recent years the anti-ricketic properties were ascribed to a separate vitamin designated vitamin D. I have found that the remaining vitamin A may be further differentiated into two substances which I have tentatively designated vitamin A and vitamin a.

For the purpose of description vitamin A is included to mean a vitamin which possesses the property of preventing xerophthalmia in experimental animals, such as white rats; and vitamin a is described as a stimulant to growth, lacking apparently either in the property of preventing xerophthalmia or of preventing rickets.

I have discovered that by treating a suitable substrate with radiations of light inclusive of the infra-red and ultra-violet and the radiations therebetween, as well as corpuscular discharges not ordinarily included in the electromagnetic spectrum, that certain syntheses take place. I have disclosed these effects in my Patent Number 1,681,120 and patent application, Serial Number 239,258, filed December 10, 1927. Among the substances used as substrates are cholesterol, olive oil, oleomargarine and others, of which the above are but class examples.

The following facts will form a basis for my present disclosure:

Freshly prepared cholesterol lacking in vitamin activity produces with a solution of antimony trichloride in chloroform a yellowish color which turns Burgundy red on standing.

Cholesterol which has been heated to fusion strikes with the same re-agent an intense blue color, exactly identical to that obtained with a preparation, such as cod liver oil containing vitamin A.

It does not seem to be sufficient merely that the cholesterol be brought simply to the melting point, for when it is merely melted and then again cooled, the color reaction described is not struck. When the cholesterol is melted it is necessary to continue exposure to infra-red radiation in consequence of which changes take place leading to the re-crystallization of the cooled product so as to give the color reaction described.

Cholesterol which has not been heated to fusion, but which has been exposed to infrared radiation short of the fusing point strikes a purplish color, clearly a mixture of the red and blue, depending upon the amount of cholesterol converted.

Cholesterol so treated and incorporated in the diet of experimental animals, such as white rats, lacking in vitamin A, imparts to the diet the property of preventing xerophthalmia and thus responds to the biological test for vitamin A.

In addition to the color test described, cholesterol properly treated with infra-red radiation strikes a deep blue color with a solution of stannic chloride in chloroform. If to a solution of treated cholesterol in chloroform there be added anhydrous ferric chloride, there is produced a reddish, purplish color together with a fluorescence; but this test is inconstant and appears to depend for its success on the use of absolutely anhydrous ferric chloride. If anhydrous aluminum chloride is added to a chloroform solution of the treated cholesterol, and then there be passed through the solution some dry hydrochloric acid gas, a delicate purple color is obtained. All of these tests have been described in the literature as color reactions attributed to vitamin A.

From the above it will be seen that vitamin A may be synthesized from cholesterol. The simple fusion treatment apparently effects a complete conversion and experimentation shows that there is developed an anti-ricketic effect and also an anti-xerophthalmic effect. It can be shown that by irradiating the cholesterol with ultra-violet radiation that the same anti-ricketic and anti-xerophthalmic effects will be produced.

In this application ultra-violet radiation is meant to include wave-lengths beginning at about 4000 Ångström units and extending throughout the near, middle and far regions inclusive of the so-called "border line" rays. No distinction is made as in the case of the so-called biologic and non-biologic rays defined in the previous patent and patent application mentioned above.

Oxidation of a substance tends to destroy its vitamin A content if it ever had such. For instance, when Sherman Pappenheimer Diet No. 84 is formed in thin layers, thorough oxidation will effect the destruction of its vitamin A content. White rats receiving this diet develop xerophthalmia and rickets. If, however, the diet is admixed so that each portion of five grams contains approximately ½ milligram of cholesterol treated as hereinafter described, rickets developed in such rats, but no xerophthalmia. Further, such rats show proportional greater gains in weight than rats not so treated.

Sherman Pappenheimer Diet, No. 84 comprises: 95% patent flour, 2.9% calcium lactate, 2% sodium chloride, 0.1% ferric citrate.

It appears that vitamin A and vitamin D arise from the same basic substance, which may be cholesterol, or an allied contaminant of cholesterol; and that radiations inclusive of infra-red and ultra-violet are capable of effecting synthesis of A and of D. It would seem, further, that in the case of infra-red radiation vitamin A is formed in abundance after which vitamin D appears; but in the case of ultra-violet radiation, D is apparently produced without a great accompaniment of A.

From the above it is clear that oxygenation is destructive of vitamin A. Cholesterol which has been treated so as to give vitamin A properties retains its biologic and chemical activity if it is stored away from an excess of air, as in hermetically sealed tubes, or if it is dissolved in oil. However, free access of air quickly dispels both the biologic and chemical characteristics of the synthesized vitamin A.

Ultra-violet radiation, as from a quartz, mercury-vapour lamp, is prone to induce much oxidation, perhaps owing to the generation of ozone in the air admixed with the material undergoing irradiation; but if cholesterol is treated with ultra-violet radiation in a fashion to exclude the presence of air, as for example in a sealed quartz tube or vessel or the like from which the air has been exhausted or substantially evacuated or replaced with an inert gas, the cholesterol then acquires its vitamin A and vitamin D activity apparently in the same proportions as are to be observed when the treatment is conducted with infra-red radiation. A quartz vessel is preferable where ultra-violet radiation is used, because glass or the like obstructs such radiation. The point is that the vessel should be transparent to the type of radiation used in the process of irradiation, and "transparent" is to be construed in this specification as meaning that the vessel to which it applies will pass the radiation used, regardless of what the radiation is.

It is to be understood that the example of the ultra-violet radiation as producing the oxidation is merely illustrative and that other radiations, as ordinarily carried out, are apt to involve an oxidizing effect and that the present invention includes the positioning of the material to be treated out of contact with the air in the case of the treatment by any type of radiation and in a suitable ambient gas, vacuum or substance for protecting the material.

By inert gas is meant herein one which will not affect oxidation such as nitrogen, argon and the like.

In view of the above, it will be seen that the several objects of the invention are achieved and other advantageous results attained.

As many changes could be made in carrying out the above constructions without departing from the scope of the invention, it is intended that all matter contained in the above description shall be interpreted as illustrative and not in a limiting sense.

I claim:

1. The method of synthesizing vitamin

A comprising treating a suitable substance by suitable radiation to effect synthesis of said vitamin A, the substance being positioned in a region of ambient, inert gas, said radiation being continued only long enough to produce said vitamin A and being discontinued before vitamin D is substantially produced.

2. The method of synthesizing vitamin A comprising treating a suitable substance by suitable radiation to effect synthesis of said vitamin A, the substance being positioned in a region of ambient, inert gas, said gas comprising nitrogen, said radiation being continued only long enough to produce said vitamin A and being discontinued before a substantial amount of vitamin D is produced.

3. The method of synthesizing vitamin A which comprises irradiating a suitable substance with ultra-violet rays in a non-oxidizing region, said irradiation being discontinued after vitamin A is produced but before a substantial amount of vitamin D is produced.

4. The method of synthesizing vitamin A which comprises irradiating cholesterol with ultra-violet rays in a non-oxidizing region, said irradiation being discontinued after vitamin A is produced, but before a substantial amount of vitamin D is produced.

In testimony whereof, I have signed my name to this specification this 18th day of August, 1928.

AUGUST J. PACINI.